US012749774B2

(12) United States Patent
Schlaupitz

(10) Patent No.: US 12,749,774 B2
(45) Date of Patent: Sep. 29, 2026

(54) ELECTROCHEMICAL BATTERY MODULE AND METHOD THEREFOR

(71) Applicant: GM GLOBAL TECHNOLOGY OPERATIONS LLC, Detroit, MI (US)

(72) Inventor: Christopher Schlaupitz, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 722 days.

(21) Appl. No.: 18/159,971

(22) Filed: Jan. 26, 2023

(65) Prior Publication Data

US 2024/0258656 A1 Aug. 1, 2024

(51) Int. Cl.

| | |
|---|---|
| ***H01M 50/51*** | (2021.01) |
| ***H01M 50/209*** | (2021.01) |
| ***H01M 50/211*** | (2021.01) |
| ***H01M 50/213*** | (2021.01) |
| ***H01M 50/503*** | (2021.01) |
| ***H01M 50/507*** | (2021.01) |
| ***H01M 50/512*** | (2021.01) |
| ***H01M 50/514*** | (2021.01) |
| ***H01M 50/524*** | (2021.01) |

(52) U.S. Cl.

CPC ....... *H01M 50/514* (2021.01); *H01M 50/209* (2021.01); *H01M 50/211* (2021.01); *H01M 50/213* (2021.01); *H01M 50/503* (2021.01); *H01M 50/507* (2021.01); *H01M 50/51* (2021.01); *H01M 50/512* (2021.01); *H01M 50/524* (2021.01)

(58) Field of Classification Search

None

See application file for complete search history.

(56) References Cited

U.S. PATENT DOCUMENTS

| | | | | |
|---|---|---|---|---|
| 2018/0083251 | A1* | 3/2018 | Newman | B60L 3/04 |
| 2020/0203941 | A1* | 6/2020 | Ing | H05K 1/118 |
| 2021/0296721 | A1* | 9/2021 | Omura | H01M 10/647 |
| 2023/0198100 | A1* | 6/2023 | Tran | H01M 50/522 174/68.2 |

FOREIGN PATENT DOCUMENTS

| | | | |
|---|---|---|---|
| DE | 102008040343 | A1 | 1/2010 |
| DE | 102012015910 | A1 | 2/2014 |
| EP | 2522043 | B1 | 11/2012 |

OTHER PUBLICATIONS

Machine translation of CN 2746573 Y.*

* cited by examiner

*Primary Examiner* — Jonathan G Leong
*Assistant Examiner* — Tony S Chuo
(74) *Attorney, Agent, or Firm* — Quinn IP Law

(57) ABSTRACT

A battery module composed of a plurality of electrochemical cells has selected positive and negative terminals being electrically connected and weldlessly mechanically joined employing a first adhesive material having electrically conductive properties and a second adhesive material having electrically isolative properties.

20 Claims, 2 Drawing Sheets

ELECTROCHEMICAL BATTERY MODULE AND METHOD THEREFOR

INTRODUCTION

The disclosure relates to an electrochemical battery module, and a method of fabricating the battery module.

Battery modules may be constructed from a plurality of electrochemical cells that are electrically interconnected. Each of the electrochemical cells includes a positive terminal and a negative terminal, with selected terminals of each of the electrochemical cells being soldered or welded to fixedly attached and electrically connect the cells in either a parallel manner or a serial manner to achieve a target voltage level at and/or a target current level across positive and negative terminals of the battery module.

There is a need to provide a battery module having the positive and negative terminals being joined in an improved manner. There is a need to provide an improved process for mechanically and electrically joining selected terminals of a battery module.

SUMMARY

The concepts described herein provide a battery module having selected positive and negative terminals being electrically connected and weldlessly mechanically joined employing a first adhesive material having electrically conductive properties and a second adhesive material having electrically isolative properties.

An aspect of the disclosure may include a battery assembly having a plurality of electrochemical cells, wherein each electrochemical cell has a positive terminal and a negative terminal; a plurality of interconnect boards (ICBs); and a first adhesive material. A first set of the positive and negative terminals of the plurality of electrochemical cells are electrically connected and weldlessly mechanically joined via a first set of the ICBs employing the first adhesive material; and a second set of the positive and negative terminals of the plurality of electrochemical cells are electrically connected and weldlessly mechanically joined via a second set of the ICBs employing the first adhesive material.

Another aspect of the disclosure may include the first adhesive material being an electrically conductive mechanically adhesive material.

Another aspect of the disclosure may include a second adhesive material, wherein selected portions of the plurality of ICBs are weldlessly mechanically joined to adjacent portions of the electrochemical cells via the second adhesive material.

Another aspect of the disclosure may include the second adhesive material being an electrically isolative mechanically adhesive material, and wherein the selected portions of the plurality of ICBs are weldlessly mechanically joined to and electrically isolated from the adjacent portions of the electrochemical cells via the second adhesive material.

Another aspect of the disclosure may include one of the plurality of ICBs being a flexible ICB.

Another aspect of the disclosure may include the flexible ICB being a woven wire mesh, wherein the woven wire mesh is encased in a polymeric substance.

Another aspect of the disclosure may include one of the plurality of ICBs being a rigid ICB.

Another aspect of the disclosure may include the rigid ICB being an elongated element that is fabricated from an electrically conductive material that is covered with an electrically isolating material, wherein the elongated element is a multi-height element.

Another aspect of the disclosure may include each of the plurality of ICBs being an elongated conductive core element encased in an electrically isolating material, wherein the electrically isolating material has cutout portions that expose a portion of the elongated conductive core element adjacent to a proximal one of the positive terminal or the negative terminal of one of the plurality of electrochemical cells.

Another aspect of the disclosure may include a positive battery electrode being electrically connected to the first set of the positive and negative terminals, and a negative electrode being electrically connected to the second set of the positive and negative terminals.

Another aspect of the disclosure may include the first set of the positive and negative terminals of the plurality of electrochemical cells being electrically connected via a first set of the ICBs, which includes the positive terminals of the plurality of electrochemical cells being electrically connected. The second set of the positive and negative terminals of the plurality of electrochemical cells being electrically connected includes the negative terminals of the plurality of electrochemical cells being electrically connected.

Another aspect of the disclosure may include the plurality of electrochemical cells being electrically connected in parallel.

Another aspect of the disclosure may include the plurality of electrochemical cells being electrically connected in series.

Another aspect of the disclosure may include each of the electrochemical cells being one of a cylindrical cell, a prismatic cell, or a pouch cell.

Another aspect of the disclosure may include a battery assembly that includes a plurality of electrochemical cells, each electrochemical cell having a positive terminal and a negative terminal; and a first adhesive material; wherein a first set of the positive and negative terminals of the plurality of electrochemical cells are electrically connected and weldlessly mechanically joined employing the first adhesive material; and wherein a second set of the positive and negative terminals of the plurality of electrochemical cells are electrically connected and weldlessly mechanically joined employing the first adhesive material, and wherein the first adhesive material comprises an electrically conductive mechanically adhesive material.

Another aspect of the disclosure may include a method for assembling a multicell battery that includes arranging a plurality of electrochemical cells, wherein each of the electrochemical cells includes a positive terminal and a negative terminal; joining, via a first set of interconnect boards, a first set of the positive and negative terminals of the plurality of electrochemical cells, wherein the first set of the positive and negative terminals of the plurality of electrochemical cells are electrically connected and weldlessly mechanically joined via the first set of interconnect boards employing a first adhesive material, wherein the first adhesive material is an electrically conductive mechanically adhesive material; and joining, via a second set of interconnect boards, a second set of the positive and negative terminals of the plurality of electrochemical cells, wherein the second set of the positive and negative terminals of the plurality of electrochemical cells are electrically connected and weldlessly mechanically joined via the second set of interconnect boards employing the first adhesive material.

Another aspect of the disclosure may include weldlessly mechanically joining selected portions of the plurality of ICBs to adjacent portions of the electrochemical cells via a second adhesive material, wherein the second adhesive material is an electrically isolative mechanically adhesive material.

Another aspect of the disclosure may include a method for assembling a multicell battery that includes arranging a plurality of electrochemical cells, wherein each of the electrochemical cells includes a positive terminal and a negative terminal; joining a first set of the positive and negative terminals of the plurality of electrochemical cells via a first set of interconnect boards, including attaching exposed portions of the first set of interconnect boards to the first set of the positive and negative terminals via a first adhesive material, wherein the first adhesive material is an electrically conductive mechanically adhesive material; and joining a second set of the positive and negative terminals of the plurality of electrochemical cells via a second set of interconnect boards, including attaching exposed portions of the second set of interconnect boards to the second set of the positive and negative terminals via the first adhesive material.

Another aspect of the disclosure may include curing the first adhesive material at room temperature.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
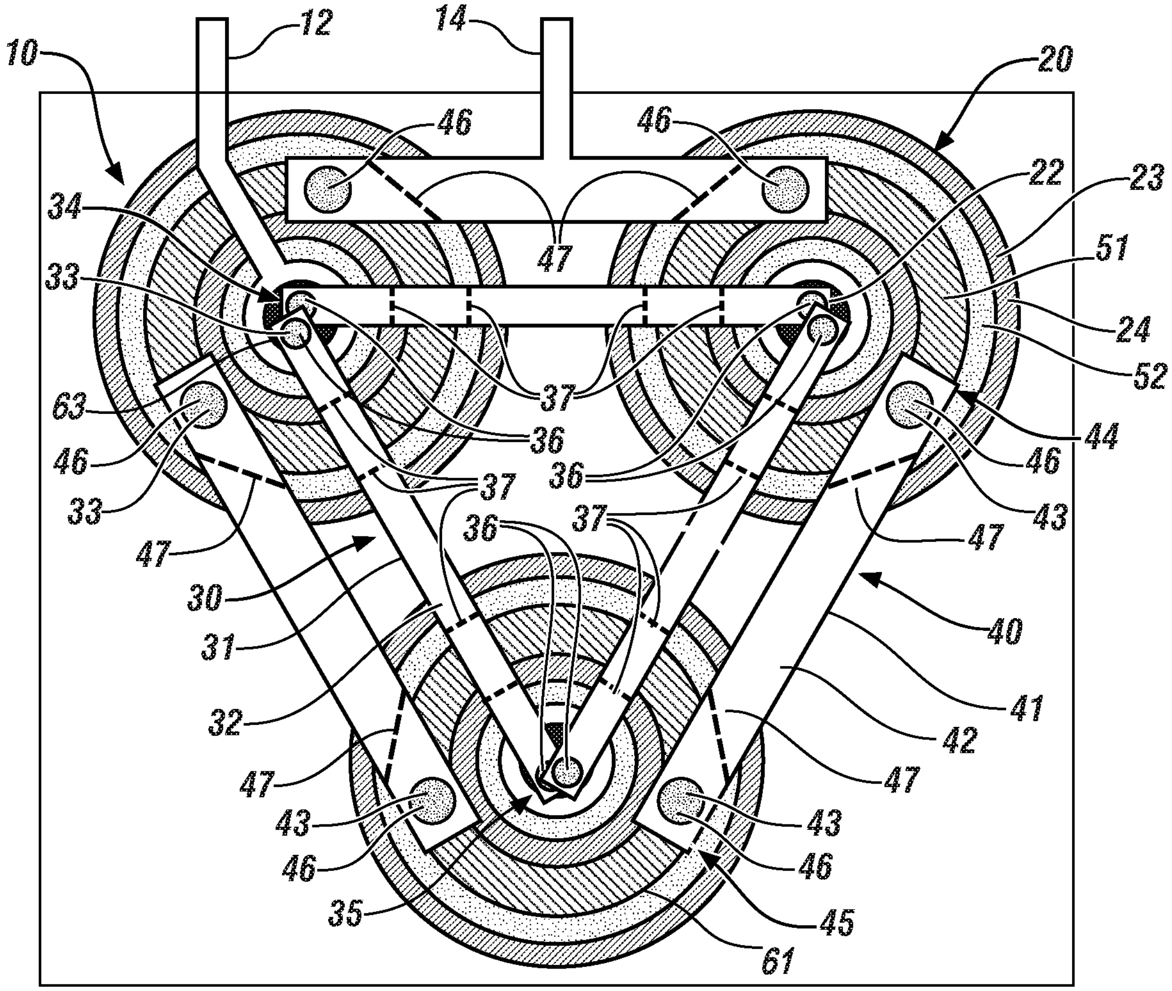
FIG. 1 schematically illustrates a top-view of a battery assembly, with the battery assembly being composed of a plurality of electrochemical cells, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure.

Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features.

For the sake of brevity, certain components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

FIG. 1 schematically illustrates a top-view of a battery assembly 10, with the battery assembly 10 being composed of a plurality of electrochemical cells 20 that are electrically connected and mechanically joined employing a plurality of interconnect boards that are weldlessly mechanically joined to respective positive and negative terminals of the plurality of electrochemical cells 20. As shown, three cylindrically-shaped electrochemical cells 20 are mechanically joined and electrically connected in parallel. The concepts described herein may be employed to mechanically join and electrically connect various types of electrochemical cells 20, including cylindrical cells, pouch cells, prismatic cells, and other cells, without limitation. Furthermore, the concepts described herein may be employed to mechanically join and electrically connect the various types of electrochemical cells 20 in series electrically, or in parallel electrically, or in some combination of series and parallel arrangements electrically, without limitation.

The battery assembly 10 has a positive tab 12 and a negative tab 14. In some embodiments, a reference terminal (not shown) may be included.

Each of the electrochemical cells 20 has a positive terminal 22 and a negative terminal 24. When electrochemical cell 20 is arranged as a cylindrical device, the negative terminal 24 is part of an outer cylindrically shaped outer can 23 that encompasses and enshrouds the electrochemical cell 20. As shown, each of the electrochemical cells 20 is a cylindrical device having positive terminal 22 and the outer can 23 that forms the negative terminal 24. The positive terminal 22 is centrally arranged, and the negative terminal 24 is annular to the positive terminal 22 and is electrically isolated from the positive terminal 22.

In one embodiment, the plurality of electrochemical cells 20 employ lithium-ion or lithium-metal electrochemical arrangements to store and generate electrical energy, although the concepts described herein are not so limited.

The electrochemical cells 20 may employ other electrochemical arrangements to generate and store electrical energy, without limit.

In one embodiment and as illustrated, there are three of the electrochemical cells 20, with the positive terminals 22 of the three electrochemical cells 20 being electrically connected and weldlessly mechanically joined employing first interconnect boards (ICBs) 30, and with the negative terminals 24 of the three electrochemical cells 20 being electrically connected and weldlessly mechanically joined employing second interconnect boards (ICBs) 40.

Welding refers to the uniting or fusing of pieces by using heat and/or compression so that the pieces form a continuum of material.

As employed herein, the term "weldless", "weldlessly joined", "weld-free", and related terms refer to a process of joining two or more elements and a resulting junction that is formed by adhesion of the elements, and without employing heat, electrical energy, or pressure in a manner that fuses the materials of the two or more elements to form a continuum.

Each of the first interconnect boards 30 is arranged as an elongated element 31 that is fabricated from an electrically conductive material that is conformably covered with an electrically isolating material 32. Each of the first interconnect boards 30 has a first end 34 and a second end 35. Portions of the electrically isolating material 32 are removed from the first and second ends 34, 35 to form exposed portions 33 of the elongated element 31. The exposed portions 33 of the conductive material on the first and second ends 34, 35 of the first interconnect boards 30 are electrically connected and weldlessly mechanically joined to the positive terminals 22 of the respective electrochemical cell 20 employing a plurality of (second) adhesive joints 63 that are formed from a first electrically conductive adhesive material 51.

The elongated elements 31 of first interconnect boards 30 are fabricated from electrically conductive material, including, e.g., copper or an alloy thereof; aluminum or an alloy thereof; tin or an alloy thereof; brass; silver or an alloy thereof; or another electrically conductive material, without limitation. The elongated elements 31 of first interconnect boards 30 may be fabricated as a solid material that is stamped, extruded, or otherwise formed; a wire mesh; a woven wire mesh; a wire cloth; a woven or wire mesh that incorporates a polymeric substance; or another arrangement without limitation. In one embodiment, the first interconnect boards 30 and the second interconnect boards 40 are rigid elements. In one embodiment, the first interconnect boards 30 and the second interconnect boards 40 are flexible elements. In one embodiment, the first interconnect boards 30 and the second interconnect boards 40 are flat elements. In one embodiment, the first interconnect boards 30 and the second interconnect boards 40 have one or multiple bends or angles so as to have multiple heights to accommodate height differences between connected ones of the electrochemical cells 20.

All or portions of the elongated elements 31 of the first interconnect boards 30 may include rigid elements, such as busbars.

In one embodiment, the rigid elements of the elongated elements 31 of the first interconnect boards 30 may be arranged to have multiple heights when employed, to accommodate height differences between terminals of the electrochemical cells 20 that are being electrically connected.

In one embodiment, the rigid elements of the elongated elements 31 may 31 may be arranged to accommodate differential heights between terminals of the electrochemical cells 20 when employed.

The exposed portions 33 on the first and second ends 34, 35 of the first interconnect boards 30 are electrically connected and weldlessly mechanically joined to the positive terminals 22 of the respective electrochemical cell 20 via a first, electrically conductive adhesive material 51. Furthermore, unexposed, i.e., coated portions of the first interconnect boards 30 are weldlessly mechanically joined to the outer can 23 of respective electrochemical cell 20, i.e., electrically isolated portions of the negative terminals 24 of the respective electrochemical cell 20 via a second, non-conductive and electrically isolating adhesive material 52.

The use of the first electrically conductive adhesive material 51 and the electrically isolating adhesive material 52 to weldlessly mechanically join the first and second interconnect boards 30, 40 to the positive and negative terminals 22, 24 of the plurality of electrochemical cells 20 enhances the mechanical connections and provides stress relief at the individual junctions.

The first electrically conductive adhesive material 51 may be fabricated by loading an adhesive component with conductive fillers. Non-limiting examples of adhesive materials include organic or synthetic resins, varnish, or silicone. Non-limiting examples of conductive fillers include metals, metal oxides, or metal nitrides such as aluminum, copper, silver, nickel, and graphite in their various forms.

The first electrically conductive adhesive material 51 may be cured by various methods such as heat cure, air drying cure, moisture cure, radiation cure or using a hardener agent, e.g., a 2-part adhesive. In one embodiment, the malleable curable conductive adhesive material includes a thermosetting polymer that is able to cure in place without additional processing steps.

The malleable curable conductive adhesive is applied onto a surface of the end cap in an uncured state to form the second conductive adhesive pad 135, and is subjected to a curing process after assembly of the battery assembly 10.

The second, non-conductive and electrically isolating adhesive material 52 may be fabricated from silicone or alternate insulative materials.

The second, non-conductive and electrically isolating adhesive material 52 is cured employing one or more methods such as heat cure, air drying cure, moisture cure, radiation cure or using a hardener agent (2-part adhesive).

In similar manner, each of the second interconnect boards 40 is arranged as an elongated element 41 that is fabricated from an electrically conductive material that is conformably encased with an electrically isolating material 42. The electrically isolating material 42 may be a polymeric substance, which may be applied by a dipping process or another process. Each of the second interconnect boards 40 has a first end 44 and a second end 45. Portions of the electrically isolating material 42 are removed from the first and second ends 44, 45 to form exposed portions 43 of the electrically conductive material of the elongated element 41. The exposed portions 43 on the first and second ends 44, 45 of the second interconnect boards 40 are mechanically and electrically joined to the negative terminals 24 of the respective electrochemical cell 20 employing a plurality of (first) adhesive joints 61 that are formed from the first electrically conductive adhesive material 51.

The elongated elements 41 of second interconnect boards 40 are fabricated from electrically conductive material, including, e.g., copper or an alloy thereof; aluminum or an alloy thereof; tin or an alloy thereof; brass; silver or an alloy thereof; or another electrically conductive material, without limitation. The elongated elements 41 of second interconnect boards 40 may be fabricated as a solid material that is stamped, extruded, or otherwise formed; a wire mesh; a woven wire mesh; a wire cloth; a woven or wire mesh that incorporates a polymeric substance; or another arrangement without limitation.

The exposed portions 43 on the first and second ends 44, 45 of the second interconnect boards 40 are electrically connected and weldlessly mechanically joined to the negative terminals 24 of the respective electrochemical cells 20 via the first electrically conductive adhesive material 51. Furthermore, unexposed, i.e., coated portions of the second interconnect boards 40 are weldlessly mechanically joined to the shell 23 of respective electrochemical cell 20, i.e., electrically isolated portions of the negative terminals 24 of the respective electrochemical cell 20, via a second, non-conductive and electrically isolating adhesive material 52.

As illustrated, the positive terminals 22 of the three electrochemical cells 20 are electrically connected in parallel and weldlessly joined employing the first interconnect boards 30 and the first electrically conductive adhesive material 51. This is schematically illustrated as a plurality of first electrically connected weldless junctions 36. The negative terminals 24 of the three electrochemical cells 20 are electrically connected in parallel and weldlessly joined employing the second interconnect boards 40 and the first electrically conductive adhesive material 51. This is schematically illustrated as a plurality of second electrically connected weldless junctions 46.

Furthermore, additional structural integrity may be achieved by joining the first interconnect boards 30 to the plurality of electrochemical cells 20 at a first plurality of electrically isolated weldless junctions 37 employing the second, non-conductive and electrically isolating adhesive material 52.

Furthermore, additional structural integrity may be achieved by joining the second interconnect boards 40 to the plurality of electrochemical cells 20 at a second plurality of electrically isolated weldless junctions 47 employing the second, non-conductive and electrically isolating adhesive material 52.

A process for assembling an embodiment of the multicell battery 10 that is described with reference to FIG. 1 includes arranging a plurality of the electrochemical cells 20, wherein each of the electrochemical cells includes a positive terminal 22 and a negative terminal 24. The method includes joining, via the first set of interconnect boards 30, a first set of the positive and negative terminals of the plurality of electrochemical cells 20, wherein the first set of the positive and negative terminals of the plurality of electrochemical cells are electrically connected and weldlessly mechanically joined via the first set of interconnect boards 30 employing the first electrically conductive adhesive material 51. The method further includes joining, via the second set of interconnect boards 40, a second set of the positive and negative terminals of the plurality of electrochemical cells 10, wherein the second set of the positive and negative terminals of the plurality of electrochemical cells are electrically connected and weldlessly mechanically joined via the second set of interconnect boards 40 employing the first electrically conductive adhesive material 51. This may further include weldlessly mechanically joining selected portions of the plurality of ICBs 30 to adjacent portions of the electrochemical cells via the second adhesive material 52, wherein the second adhesive material 52 comprises an electrically isolative mechanically adhesive material.

Another process for assembling the multicell battery described with reference to FIG. 1 may include arranging a plurality of electrochemical cells 20, wherein each of the electrochemical cells includes a positive terminal and a negative terminal, joining a first set of the positive and negative terminals of the plurality of electrochemical cells via a first set of interconnect boards, including attaching exposed portions of the first set of interconnect boards to the first set of the positive and negative terminals via a first adhesive material, wherein the first adhesive material that is an electrically conductive mechanically adhesive material; and joining a second set of the positive and negative terminals of the plurality of electrochemical cells via a second set of interconnect boards, including attaching exposed portions of the second set of interconnect boards to the second set of the positive and negative terminals via the first adhesive material. The process may further include curing the first adhesive material at room temperature.

Figure 2:
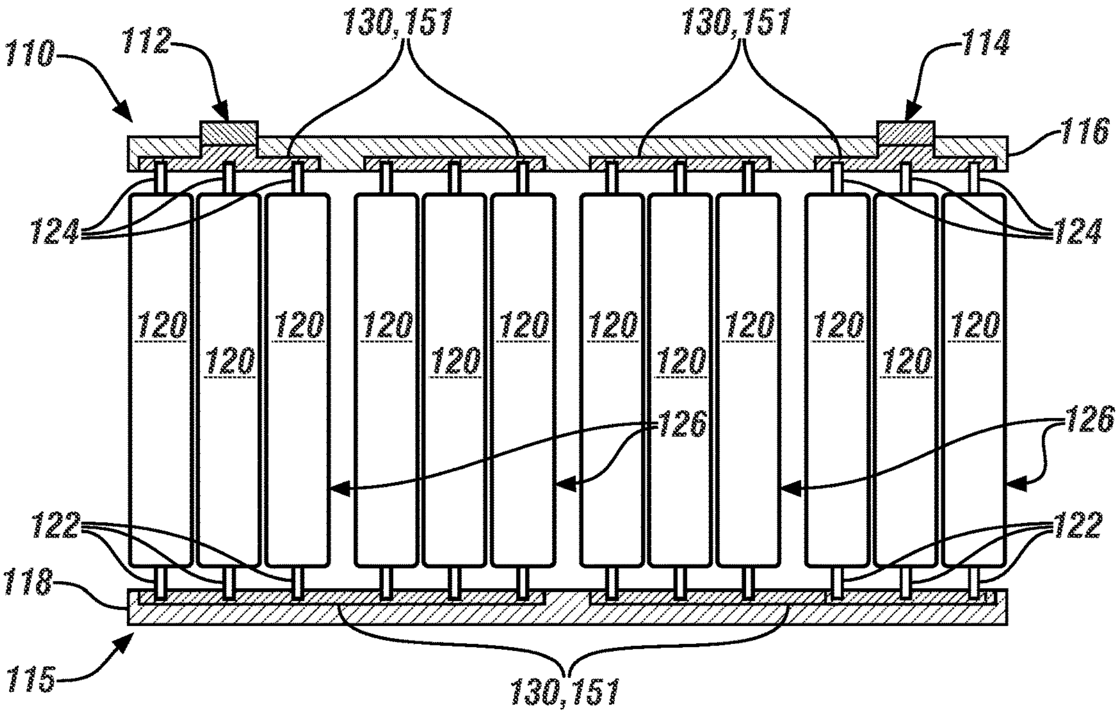
FIG. 2 schematically illustrates a sideview of an embodiment of a battery assembly, in accordance with the disclosure.

FIG. 2 schematically illustrates a side view of another embodiment of a battery assembly 110, with the battery assembly 110 being composed of a plurality of electrochemical cells 120 that are electrically connected and mechanically joined employing an electrically conductive adhesive material 151. The plurality of electrochemical cells 120 may be prismatic pouch cells in one embodiment, or prismatic can cells in one embodiment, or another configuration.

The battery assembly 110 includes the plurality of prismatically-shaped electrochemical cells 120; a case 115 having a first, upper plate portion 116 and a second, lower plate portion 118; a positive tab 112; and a negative tab 114. Each of the electrochemical cells 120 has a positive terminal 122 and a negative terminal 124.

As shown, and in one non-limiting example, the plurality of electrochemical cells 120 includes four sets 126 of the electrochemical cells 120, with each of the sets 126 containing three of the electrochemical cells 120 arranged in parallel, and with the four sets 126 being arranged in series between the positive tab 112 and the negative tab 114.

No interconnect boards, rigid bus bars, or copper or aluminum interconnect bars are employed in this embodiment. Instead, interconnection of the respective positive and negative terminals 122, 124 of the plurality of electrochemical cells 120 is achieved using a plurality of pliable busbars 130 that are formed with the electrically conductive adhesive material 151.

In one embodiment, the plurality of pliable busbars 130 are extruded onto the first, upper plate portion 116 and the second, lower plate portion 118, and the respective positive and negative terminals 122, 124 of the plurality of electrochemical cells 120 are inserted therein during battery assembly prior to curing the electrically conductive adhesive material 151.

In one embodiment, electrical connectivity and mechanical connections between the respective positive and negative terminals 122, 124 of the plurality of electrochemical cells 120 may be achieved and formed solely with the electrically conductive adhesive material 151.

In one embodiment, electrical connectivity and mechanical connections between the respective positive and negative terminals 122, 124 of the plurality of electrochemical cells 120 may be achieved with the electrically conductive adhesive material 151 in conjunction with soldering or brazing of one or a portion of the positive and negative terminals 122, 124 of the plurality of electrochemical cells 120 to a conductive bus bar (not shown).

The battery assembly 110 includes the plurality of prismatically-shaped electrochemical cells 120; a case 115 having a first, upper plate portion 116 and a second, lower plate portion 118; a positive tab 112; and a negative tab 114. Each of the electrochemical cells 120 has a positive terminal 122 and a negative terminal 124.

As shown, and in one non-limiting example, the plurality of electrochemical cells 120 includes four sets 126 of the electrochemical cells 120, with each of the sets 126 containing three of the electrochemical cells 120 arranged in parallel, and with the four sets 126 being arranged in series between the positive tab 112 and the negative tab 114.

No interconnect boards, rigid bus bars, or copper or aluminum interconnect bars are employed in this embodiment. Instead, the respective positive and negative terminals 122, 124 of the plurality of electrochemical cells 120 are electrically connected and mechanically joined using a plurality of pliable busbars 130 that are formed with the electrically conductive adhesive material 151 on one of the first, upper plate portion 116 or the second, lower plate portion 118. The first, upper plate portion 116 and the second, lower plate portion 118 are formed from non-conductive material.

Figure 3:
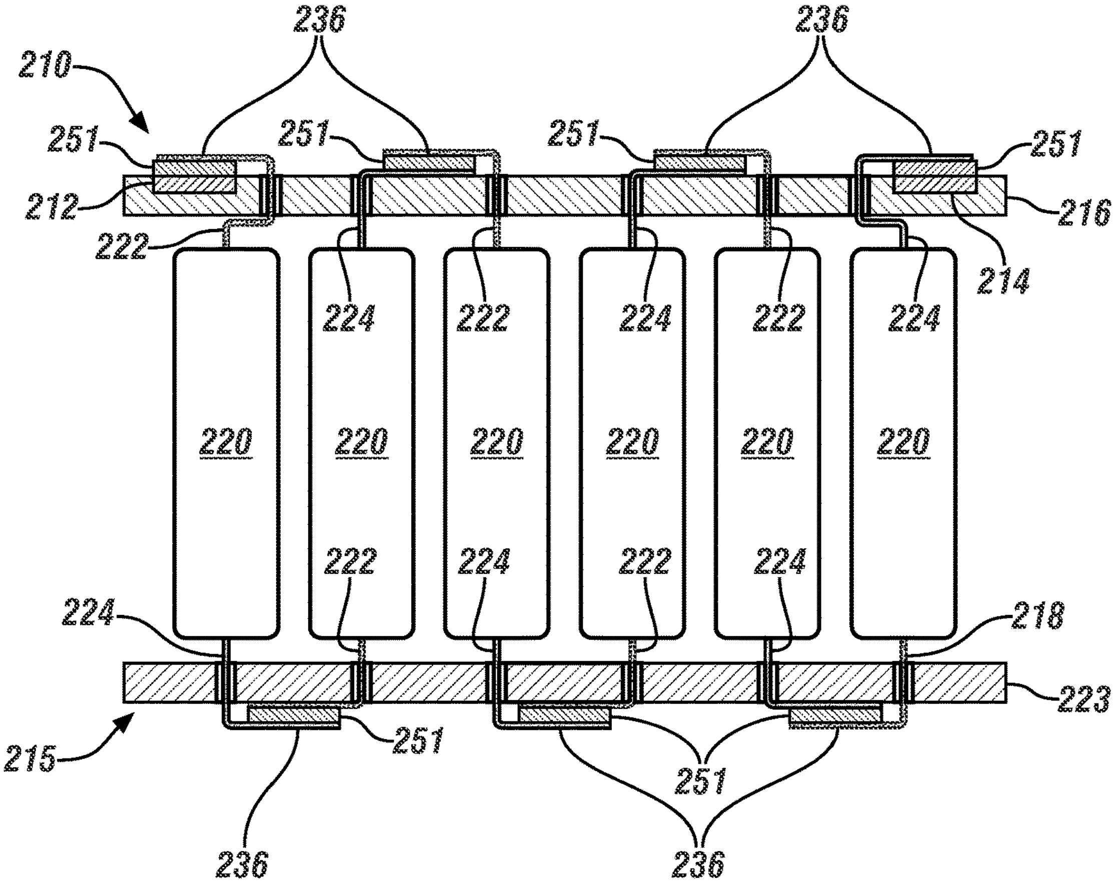
FIG. 3 schematically illustrates a sideview of another embodiment of a battery assembly, in accordance with the disclosure.

FIG. 3 schematically illustrates a side view of another embodiment of a battery assembly 210, with the battery assembly 210 being composed of a plurality of electrochemical cells 220 that are electrically connected and mechanically joined employing an electrically conductive adhesive material 251.

The battery assembly 210 includes the plurality of prismatically-shaped or pouch-style electrochemical cells 220; a case 215 having a first, upper portion 216 and a second, lower portion 218; a positive tab 212; and a negative tab 214. Each of the electrochemical cells 220 has a positive terminal 222 and a negative terminal 224.

As shown, and in one non-limiting example, the plurality of electrochemical cells 220 are arranged in series between the positive tab 212 and the negative tab 214.

No interconnect boards, rigid bus bars, or copper or aluminum interconnect bars are employed in this embodiment. Instead, interconnection of the respective positive and negative terminals 222, 224 of the plurality of electrochemical cells 220 is achieved using a plurality of pliable busbars 236 that are formed with the electrically conductive adhesive material 251 at or near the first, upper portion 216 and the second, lower portion 218.

In this manner, a battery assembly composed of a plurality of electrochemical cells that are electrically connected and weldlessly mechanically joined to a plurality of interconnect boards (ICBs) via an electrically conductive adhesive material, which may serve to improve manufacturability and may reduce in-use faults.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A battery assembly, comprising:

a plurality of electrochemical cells each having a cylindrical outer can, a positive terminal located at a longitudinal end of the cylindrical outer can, and a negative terminal located at the longitudinal end of the cylindrical outer can and circumscribing the positive terminal;

a plurality of interconnect boards (ICBs);

a plurality of first adhesive joints each located at the longitudinal end of a respective one of the cylindrical outer cans and having an annular shape circumscribing a respective one of the positive terminals, the first adhesive joints electrically connecting and weldlessly mechanically joining the negative terminals of the plurality of electrochemical cells to a first set of the ICBs; and a plurality of second adhesive joints each located at the longitudinal end of a respective one of the cylindrical outer cans and circumscribed by a respective one of the first adhesive joints, the second adhesive joints electrically connecting and weldlessly mechanically joining the positive terminals of the plurality of electrochemical cells to a second set of the ICBs distinct from the first set of the ICBs.

2. The battery assembly of claim 1, wherein each of the first and second adhesive joints includes a first adhesive material, the first adhesive material comprising an electrically conductive mechanically adhesive material.

3. The battery assembly of claim 2, further comprising a plurality of third adhesive joints including a second adhesive material distinct from the first adhesive material, wherein selected portions of the plurality of ICBs are weldlessly mechanically joined to adjacent portions of the electrochemical cells via the third adhesive joints.

4. The battery assembly of claim 3, wherein the second adhesive material comprises an electrically isolative mechanically adhesive material, and wherein the selected portions of the plurality of ICBs are weldlessly mechanically joined to and electrically isolated from the adjacent portions of the electrochemical cells via the second adhesive material.

5. The battery assembly of claim 1, wherein at least one of the plurality of ICBs comprises a flexible ICB.

6. The battery assembly of claim 5, wherein the flexible ICB includes a woven wire mesh encased in a polymeric substance.

7. The battery assembly of claim 1, wherein at least one of the plurality of ICBs comprises a rigid ICB.

8. The battery assembly of claim 7, wherein the rigid ICB includes an elongated element that is fabricated from an electrically conductive material that is covered with an electrically isolating material, and wherein the elongated element comprises a multi-height element.

9. The battery assembly of claim 1, wherein each of the plurality of ICBs comprises an elongated conductive core element encased in an electrically isolating material, wherein the electrically isolating material has cutout portions that expose a portion of the elongated conductive core element adjacent to a proximal one of the positive and the negative terminals of one of the plurality of electrochemical cells.

10. The battery assembly of claim 1, further comprising a positive battery electrode being electrically connected to a first set of the positive and negative terminals, and a negative electrode being electrically connected to a second set of the positive and negative terminals.

11. The battery assembly of claim 10, wherein the first set of the positive and negative terminals of the plurality of electrochemical cells being electrically connected to the first set of the ICBs comprises the positive terminals of the plurality of electrochemical cells being electrically connected; and wherein the second set of the positive and negative terminals of the plurality of electrochemical cells being electrically connected comprises the negative terminals of the plurality of electrochemical cells being electrically connected.

12. The battery assembly of claim 1, wherein the electrochemical cells are electrically connected in parallel.

13. The battery assembly of claim 1, wherein the electrochemical cells are electrically connected in series.

14. The battery assembly of claim 1, wherein each of the negative terminals of the electrochemical cells comprises a part of the cylindrical outer can.

15. The battery assembly of claim 1, wherein each of the positive terminals is located at a center of the longitudinal end of the cylindrical outer can, and each of the negative terminals is annular and concentric with the positive terminal.

16. A battery assembly, comprising:

a plurality of electrochemical cells each having a cylindrical outer can, a positive terminal centrally located at a longitudinal end of the cylindrical outer can, and an annular negative terminal located at the longitudinal end of the cylindrical outer can and circumscribing the positive terminal;

a positive battery tab;

a negative battery tab;

a plurality of positive busbars electrically connecting the positive terminals of the electrochemical cells to the positive battery tab;

a plurality of negative busbars electrically connecting the negative terminals of the electrochemical cells to the negative battery tab;

a plurality of first adhesive joints each located at the longitudinal end of a respective one of the cylindrical outer cans, abutting a respective one of the negative terminals, and having an annular shape circumscribing a respective one of the positive terminals, the first adhesive joints electrically connecting and weldlessly mechanically joining the negative terminals of the plurality of electrochemical cells to one another and to the negative busbars;

a plurality of second adhesive joints each located at the longitudinal end of a respective one of the cylindrical outer cans, abutting a respective one of the positive terminals, and circumscribed by a respective one of the first adhesive joints, the second adhesive joints electrically connecting and weldlessly mechanically joining the positive terminals of the plurality of electrochemical cells to one another and to the positive busbars; and a plurality of third adhesive joints each located at the longitudinal end of a respective one of the cylindrical outer cans, interposed between the first and second adhesive joints, and having an annular shape circumscribing the positive terminal and the second adhesive joint, the third adhesive joints electrically isolating the positive and negative terminals.

17. The battery assembly of claim 16, wherein each of the first and second adhesive joints comprises an electrically conductive mechanically adhesive material, and each of the third adhesive joints comprises an electrically isolative mechanically adhesive material.

18. A method for assembling a multicell battery, the method comprising:

arranging a plurality of electrochemical cells each including a cylindrical outer can, a positive terminal located at a longitudinal end of the cylindrical outer can, and a negative terminal located at the longitudinal end of the cylindrical outer can and circumscribing the positive terminal;

joining, via a first set of interconnect boards, the negative terminals of the plurality of electrochemical cells, wherein the negative terminals of the plurality of electrochemical cells are electrically connected and weldlessly mechanically joined to the first set of interconnect boards employing a plurality of first adhesive joints each located at the longitudinal end of a respective one of the cylindrical outer cans and having an annular shape circumscribing a respective one of the positive terminals, wherein each of the first adhesive joints includes a first adhesive material comprising an electrically conductive mechanically adhesive material; and joining, via a second set of interconnect boards, the positive terminals of the plurality of electrochemical cells, wherein the positive terminals of the plurality of electrochemical cells are electrically connected and weldlessly mechanically joined to the second set of interconnect boards employing a plurality of second adhesive joints each located at the longitudinal end of a respective one of the cylindrical outer cans and circumscribed by a respective one of the first adhesive joints, wherein each of the second adhesive joints includes the first adhesive material.

19. The method of claim 18, further comprising weldlessly mechanically joining selected portions of the first and second sets of interconnect boards to adjacent portions of the electrochemical cells via a plurality of third adhesive joints, each of the third adhesive joints including a second adhesive material, wherein the second adhesive material comprises an electrically isolative mechanically adhesive material.

20. The method of claim 18, further comprising curing the first adhesive material at room temperature.

* * * * *